US012206202B2

(12) United States Patent
Schwettmann et al.

(10) Patent No.: US 12,206,202 B2
(45) Date of Patent: Jan. 21, 2025

(54) HOLDING FRAME, PLUG-IN CONNECTOR AND ELECTRONIC DEVICE

(71) Applicant: Phoenix Contact GmbH & Co. KG, Blomberg (DE)

(72) Inventors: Hartmut Schwettmann, Rahden (DE); Lukas Brillo, Hoexter (DE); Manuel Tuenker, Doerentrup (DE); Thorsten Diessel, Hiddenhausen (DE)

(73) Assignee: Phoenix Contact GmbH & Co.KG, Blomberg (DE)

( * ) Notice: Subject to any disclaimer, the term of this patent is extended or adjusted under 35 U.S.C. 154(b) by 334 days.

(21) Appl. No.: 17/778,868

(22) PCT Filed: Nov. 24, 2020

(86) PCT No.: PCT/EP2020/083130
§ 371 (c)(1),
(2) Date: May 23, 2022

(87) PCT Pub. No.: WO2021/105084
PCT Pub. Date: Jun. 3, 2021

(65) Prior Publication Data

US 2022/0416468 A1 Dec. 29, 2022

(30) Foreign Application Priority Data

Nov. 25, 2019 (DE) ..................... 10 2019 131 806.8

(51) Int. Cl.
*H01R 13/518* (2006.01)
*H01R 13/506* (2006.01)

(52) U.S. Cl.
CPC .................................. *H01R 13/506* (2013.01)

(58) Field of Classification Search
CPC .................................................... H01R 13/506
See application file for complete search history.

(56) References Cited

U.S. PATENT DOCUMENTS 3,559,813 A * 2/1971 Sosinski .................. H05K 7/02 248/314
4,032,209 A * 6/1977 Rutkowski ............... H01R 9/26 439/211

(Continued)

FOREIGN PATENT DOCUMENTS

CN 101904059 A 12/2010
DE 202012103360 U1 1/2013

(Continued)

OTHER PUBLICATIONS

Roloff Matek, “Elastische Feder, Maschinenelemente (Elastic Springs, Machine Elements),” ISBN: 3-528-54028-1, Dec. 31, 1987, p. 277, Vieweg, Germany.

*Primary Examiner* — Neil Abrams
(74) *Attorney, Agent, or Firm* — LEYDIG, VOIT & MAYER, LTD.

(57) ABSTRACT

A holding frame for a plug connector, for receiving contact inserts, includes: a main frame, which has a first side wall, a second side wall opposite the first side wall, a first end wall, and a second end wall opposite the first end wall, the first side wall, the second side wall, the first end wall, and the second end wall enclosing an interior of the main frame into which the contact inserts are insertable in an insertion direction; and a plurality of wall segments, each of which has a fastening region via which the contact inserts which are inserted into the interior of the main frame are holdable on the main frame. In a mounted position, each wall segment of the plurality of wall segments is arranged on a receiving section formed on the first side wall or on the second side wall.

23 Claims, 6 Drawing Sheets

(56) References Cited

U.S. PATENT DOCUMENTS

| | | | | |
|---|---|---|---|---|
| 10,396,488 | B2 * | 8/2019 | Wölffle | H01R 13/518 |
| 10,418,773 | B2 * | 9/2019 | Herbrechtsmeier | H01R 13/506 |
| 11,038,304 | B2 * | 6/2021 | Tiemann | H01R 13/514 |
| 11,817,648 | B2 * | 11/2023 | Tiemann | H01R 13/518 |
| 2016/0276778 | A1 | 9/2016 | Beischer et al. | |
| 2018/0248299 | A1 | 8/2018 | Wölffle | |
| 2020/0059034 | A1 | 2/2020 | Tiemann et al. | |
| 2022/0399676 | A1 * | 12/2022 | Diessel | H01R 13/518 |
| 2023/0231339 | A1 * | 7/2023 | Doppler | H01R 13/514<br>439/701 |

FOREIGN PATENT DOCUMENTS

| | | | |
|---|---|---|---|
| DE | 102012110907 | A1 | 5/2014 |
| DE | 102015103563 | A1 | 9/2016 |
| DE | 102015114814 | A1 | 3/2017 |
| DE | 102016211300 | A1 | 12/2017 |
| DE | 102013113975 | B4 | 9/2018 |
| DE | 102017108430 | A1 | 10/2018 |
| DE | 102017108431 | A1 | 10/2018 |
| DE | 102019104559 | A1 | 8/2020 |

* cited by examiner

HOLDING FRAME, PLUG-IN CONNECTOR AND ELECTRONIC DEVICE

CROSS-REFERENCE TO PRIOR APPLICATIONS

This application is a U.S. National Phase application under 35 U.S.C. § 371 of International Application No. PCT/EP2020/083130, filed on Nov. 24, 2020, and claims benefit to German Patent Application No. DE 10 2019 131 806.8, filed on Nov. 25, 2019. The International Application was published in German on Jun. 3, 2021 as WO/2021/105084 under PCT Article 21(2).

FIELD

The invention relates to a holding frame for a plug connector for receiving contact inserts. The invention further relates to a plug connector having such a holding frame and to an electronic device.

BACKGROUND

Such holding frames serve for the modular use of contact inserts, for example on plug connectors. One or more contact inserts can be arranged on such a holding frame in order to be inserted together with the holding frame into a housing of a plug connector part or of a plug connector and to be connected to the housing via the holding frame. In this way, contact inserts can be combined with one another in a modular manner and arranged in or on a plug connector part via the holding frame.

Such contact inserts can, for example, have one or more electrical contacts. In this case, the contact inserts on the one hand are connected to electrical lines, which are routed to a plug connector, and on the other hand form plug contacts via which the plug connector can be brought into plug-in engagement with a mating plug connector part for electrical contact.

Such modular contact inserts offer the advantage of flexible combinability and thus a variable usability of plug connectors.

If contact inserts are inserted into a holding frame, it is necessary for the contact inserts to be held on the holding frame in order to enable the holding frame together with the contact inserts to be attached, for example, to a plug connector. In a holding frame known from DE 10 2012 110 907 A1, it is provided for this purpose that a second holding frame part can be attached to a first holding frame part, which has recesses for receiving projection elements of contact inserts, in order in this way to latch projection elements inserted into the recesses and thus lock them on the holding frame.

In a holding frame known from DE 20 2012 103 360 U1, two different recesses are provided on frame walls. Projection elements of contact inserts can be inserted into first recesses on an upper edge of the frame walls so as to engage, whereas pin-like formations of the contact inserts can be brought into latching engagement with second recesses in the form of openings.

SUMMARY

In an embodiment, the present invention provides a holding frame for a plug connector, for receiving contact inserts, comprising: a main frame, which has a first side wall, a second side wall opposite the first side wall, a first end wall, and a second end wall opposite the first end wall, the first side wall, the second side wall, the first end wall, and the second end wall enclosing an interior of the main frame into which the contact inserts are insertable in an insertion direction; and a plurality of wall segments, each of which has a fastening region via which the contact inserts which are inserted into the interior of the main frame are holdable on the main frame, wherein, in a mounted position, each wall segment of the plurality of wall segments is arranged on a receiving section formed on the first side wall or on the second side wall, wherein the respective receiving sections each have an opening configured to receive a projection element of a contact insert inserted into the interior, wherein the openings in the mounted position are each overlapped at least in some regions by the fastening region of a respective wall segment assigned to the receiving section.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
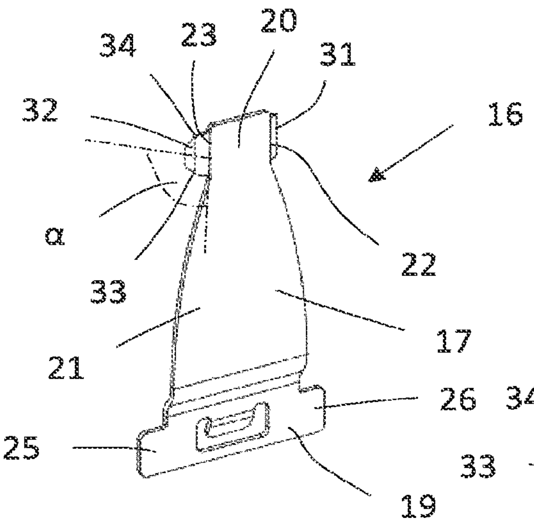
FIG. 1*a* is a schematic representation of a wall segment according to the invention.

In an embodiment, the present invention provides a holding frame, a plug connector and an electronic device, which are characterized by a simplified structural design.

The holding frame according to the invention is characterized by a main frame, which has a first side wall, a second side wall opposite the first side wall, a first end wall and a second end wall opposite the first end wall, wherein the first side wall, the second side wall, the first end wall and the second end wall enclose an interior of the main frame in which the contact inserts can be inserted in an insertion direction. The holding frame is further characterized by multiple wall segments, each having a fastening region via which the contact inserts inserted into the interior of the main frame can be held on the main frame, wherein the multiple wall segments are each arranged on a receiving section formed on the first side wall or on the second side wall, wherein the receiving sections each have an opening for receiving a projection element of a contact insert inserted into the interior, wherein the openings in the mounted position are each overlapped at least in some regions by the fastening region of the wall segment assigned to the receiving section.

The wall segments can be arranged on the main frame. Each contact insert inserted or introduced into the main frame can be held or fastened on the main frame via two oppositely arranged wall segments. The mounted position is the position in which the wall segments are arranged on the main frame and contact inserts inserted into the interior of the main frame can be held by the wall segments. Multiple receiving sections are preferably formed on each of the two side walls of the main frame. The receiving sections of a side wall are preferably arranged next to one another and thus in a row. Preferably, the receiving sections are formed in each case, at least in some regions, in the respective side wall of the main frame. A receiving section is assigned to each wall segment to be arranged on the main frame, so that one wall segment each can be arranged at each receiving section. According to the invention, each receiving sections has one opening which, in the mounted position of the wall segments on the main frame, is overlapped at least in some regions by the fastening region of the wall segment assigned to the receiving section. The openings are preferably designed in the form of apertures on the main frame or on the side walls of the main frame. The openings preferably extend starting from the upper edge of the main frame into the main frame. Via the openings, the wall segments can be brought into operative connection with the contact inserts, in particular with the projection elements of the contact inserts, in order to be able to hold the contact inserts in the interior of the main frame. For this purpose, the projection elements of the contact inserts can project into the respective opening. In the mounted position, the openings are covered, at least in some regions, by the fastening region of the respective wall segment so that the wall segments with their fastening region can each cover or overlap a projection element of an inserted contact insert at the end face. Due to the covering of the projection elements of the contact inserts at the end face by means of the wall segments, each wall segment can by means of its fastening region apply a force, in particular a compressive force, at the end face of the projection element assigned thereto, which force is oriented transversely to the insertion direction of the respective contact insert into the main frame. As a result, the positioning, and in particular the orientation of the positioning, of the contact insert in the main frame can be improved. A centering of the contact insert within the main frame can in particular be achieved thereby so that any play occurring between the contact insert and the main frame can be reduced.

In order to be able to form a coding for the insertion of the contact inserts in the correct position, the openings, formed on the first side wall, of the receiving sections can have a greater width than the openings, formed on the second side wall, of the receiving sections. The two projection elements formed on a contact insert likewise preferably have a different width so that an insertion of the contact insert can only take place in such a way that the wider projection element can be inserted into the wider opening of a receiving section and the narrower projection element of a contact insert can be inserted into the narrower opening of a receiving section. It is thereby possible to avoid incorrect plugging of the contact inserts into the main frame and thus into the holding frame.

In order to hold the contact inserts in the desired position within the interior of the main frame, the fastening region of the wall segments preferably respectively has at least one fastening tab which, in the mounted position, projects through the opening of a receiving section. The fastening tab can be designed in such a way that, in the mounted position, the fastening tab can rest on an upper side of a projection element of the respective contact insert so that, in the insertion direction of the contact insert into the main frame, the fastening tab can prevent a movement of the inserted contact insert that is counter to the insertion direction of the contact insert.

In order to be able to achieve a greater stability when the contact inserts are held in their inserted position in the main frame, the fastening region of the wall segments can have two fastening tabs which project through the opening of a receiving section in the mounted position. The two fastening tabs of a fastening region of a wall segment can be formed symmetrically to one another.

The two fastening tabs of a fastening region of a wall segment can be arranged on opposite outer edges of the wall segment. The two outer edges preferably delimit the respective wall segment. Due to the arrangement on the outer edges, the fastening tabs can be arranged in the form of two wings on the wall segment.

The fastening tabs are preferably bent in the region of the connection to the respective outer edge. Preferably, the fastening tabs are bent outward from the main extension plane of the wall segments. Preferably, the fastening tabs can each be bent at an angle $\alpha \geq 90°$ to the outer edge of the wall segment. The fastening tabs are thus bent in the direction of the interior of the main frame. Particularly preferably, the fastening tabs can each be bent at an angle $\alpha \geq 180°$ to the outer edge of the wall segment. When bent at an angle $\alpha \geq 180°$, the fastening tabs have an approximately U-shaped bend.

The receiving sections are preferably formed in each case on an outer side, facing away from the interior, of the main frame. In the mounted position, the wall segments thus preferably rest against the outer side of the main frame. Preferably, no part or region of a wall segment in the mounted position is arranged on an inner side, facing in the direction of the interior of the main frame, of the main frame. The wall segments therefore no longer have to be bent elaborately because, in the case of the wall segments according to the invention, it is no longer necessary for the lower edge of the main frame to be encompassed.

The fastening region of the wall segments can each be formed on a head region of the wall segments, which head region can be positioned on an end section, opposite a foot region, of the wall segment. The fastening region and the foot region of a wall segment thus preferably have a maximum possible distance from one another.

The wall segments are preferably each fastened or held via their foot region on the receiving section assigned to them and thus on the main frame. The wall segments are thus preferably not fastened to the main frame via their head region or their fastening region. Unlike the foot region, the head region or the fastening region is preferably exposed relative to the main frame so that, in the mounted position, preferably no contact is formed between the head region or the fastening region of the wall segment and the main frame.

The foot region of a wall segment can be fastened to the receiving section or to the main frame in various ways. For example, fastening can be formed by means of a latching connection and/or a rivet connection and/or an adhesive connection between the wall segment and the main frame.

Particularly preferably, fastening can be designed in such a way that each receiving section has a slot-like cut-out into which a foot region of one of the multiple wall segments can be inserted in the mounted position. The wall segments can thereby be arranged and fastened individually on the main frame and thus individually on their respectively assigned receiving section. With such a fastening, however, the wall segments can also be arranged and fastened in pairs on the main frame, which means that two or more wall segments can be arranged and fastened at the same time on their respectively assigned receiving section. By inserting the wall segments at least with their foot region into a slot-like cut-out of the receiving section assigned to them, the mounting of the wall segments on the main frame can take place particularly easily and quickly. The structural design of the holding frame can also be considerably simplified as a result. The slot-like cut-outs can each form a pocket on the main frame into which the wall segments, in the mounted position, can engage at least in some regions, in this case with their foot region. The foot region, with which the wall segments can be inserted into the slot-like cut-out, of the wall segments is preferably formed on an end section of the wall segments.

The slot-like cut-outs of the receiving sections are preferably each formed on a lower edge of the main frame. The wall segments can thus preferably each be fastened to the main frame from below and inserted into the slot-like cut-outs. The mounting direction of the wall segments on the main frame is thus preferably counter to the insertion direction of the contact inserts into the interior of the main frame so that an insertion of the wall segments into the respective slot-like cut-out can take place in an opposite direction to the insertion of the contact inserts into the main frame. The contact inserts are preferably inserted from above into the interior of the main frame.

The slot-like cut-outs, formed on the first side wall, of the receiving sections can be connected to one another and/or the slot-like cut-outs, formed on the second side wall, of the receiving sections can be connected to one another. The slot-like cut-outs formed on a side wall are preferably arranged one after the other in a row. If the slot-like cut-outs formed on a side wall are connected to one another, the slot-like cut-outs can take the form of a cut-out that can span all receiving sections of a side wall. Such a slot-like cut-out can extend over more than ⅔ of the length of the side wall.

The wall segments are preferably designed to be resilient. For this purpose, the wall segments can be formed, for example, from a spring plate. When a contact insert is inserted, the wall segments mounted on the main frame can thereby spring outward at their head region away from the interior of the main frame in order to enable insertion of the contact insert into the interior. If the contact insert is positioned in the desired position in the interior of the main frame, the fastening region of the wall segments can again spring or pivot back in the direction of the interior of the main frame so that the fastening region of the wall segments can hold the contact inserts in this position.

In order to be able to achieve a particularly good spring action, each wall segment can have a central section between the foot region and the head region, wherein the width of the central section can taper starting from the foot region toward the head region. As a result of this tapering, a uniform deformation of the wall segment, in particular of the central section of the wall segment, can be achieved over the bending length of the wall segment during insertion and removal of the contact inserts into/from the interior of the main frame. Due to the tapering starting from the foot region toward the fastening region, the bending stress of the wall segment can decrease from the foot region toward the fastening region. The foot region can form a clamping location of the wall segment on the main frame, in particular on a receiving section of the main frame. By reducing the width of the wall segment starting from this clamping location, i.e., the foot region of the wall segment, a uniform stress profile over the length of the wall segment can be achieved when the wall segment flexes during the insertion and removal of the respective contact insert. The elasticity of the wall segment can be increased by the tapering in the direction of the head region, whereby a kind of flexible joint can be formed on the wall segment. As seen along the length of the wall segment, the central section preferably has a substantially larger surface area than the foot region and the fastening region of the wall segment.

In the region of the central section, the outer edges of the wall segment are preferably not formed in a straight line. Instead, the outer edges, extending along the central section, of the wall segment can have a curved shape. Due to the curved shape of the outer edges, the distribution of the bending stress within the wall segment can be further improved so that the load acting on the wall segments during insertion and removal of the contact inserts can be reduced and an optimized spring action of the wall segments can be achieved at the same time.

In order to be able to achieve a separation of function between the foot region and the central section, an offset can be formed in a connection region of the foot region on the central section in such a way that the foot region can extend in a first plane and the central section can extend in a second plane arranged at an offset to the first plane. In the mounted position within the main frame, the foot region can thereby be arranged in the slot-like cut-out, wherein on the connection region, having the offset, of the wall segment, the wall segment can be guided out of the cut-out in the mounted position so that the central section and also the fastening region or the head region of the wall segment can be guided along the outer side of the main frame and they therefore no longer engage in the slot-like cut-out of the receiving section.

The receiving sections can each have a bearing face against which an inner surface, facing in the direction of the interior of the main frame, of the wall segments can rest flat in the mounted position. Due to the planar abutment of the wall segments via their central section on the respective receiving section, a good and positionally secure support of the wall segments on the receiving sections and thus on the main frame can be achieved. The bearing face preferably faces away from the interior of the main frame.

An in particular positionally secure abutment of the wall segments on the main frame can further be achieved in that the bearing face of a receiving section can be delimited by two opposite inner edges, wherein in the region of the central section of the wall segments, the outer edges of the wall segments can, in the mounted position, rest in a positive-locking manner against the inner edges of the receiving section assigned thereto. A lateral displacement of the wall segments, in particular during the insertion and removal of the contact inserts, can thereby be reliably prevented because the wall segments are supported on both sides by the outer edges and are limited in their movement.

In order to be able to further improve the fastening of the wall segments to the main frame, the wall segments can each have a fastening element at their foot region, which fastening element, in the mounted position, can be in engagement with an opening formed on the main frame. Each receiving section can have such an opening. The fastening elements can be designed, for example, in the form of a tab or a lug which, in the mounted position, in each case can enter into an opening on the main frame or on the respective receiving section and can latch or hook there.

It is further possible for an identification element to be fastened to each of the wall segments. The identification element can already be labeled or can be labeled individually by the user. The identification elements can provide the possibility of marking the contact inserts or the plug-in locations for the contact inserts in the interior of the main frame. Particularly preferably, the identification element can be fastened or fastenable to the foot region of the wall segment. The identification element can, for example, be inserted together with the foot region into the slot-like cut-out in order to fasten the identification element. In addition, it can further be possible for the identification element to be glued to the wall segment. By means of the identification element, an individual identification of the plug-in locations for the contact inserts is possible without increasing the necessary installation space for the holding frame.

The wall segments can be designed as individual elements, or else two or more wall segments arranged on a side wall can be connected to one another. The interconnected wall segments are then preferably formed integrally with one another.

Particularly preferably, the wall segments are integrally connected to one another at their foot region. If two or more wall segments are connected to one another, the fastening of the wall segments to the main frame can take place even more quickly.

The object according to the invention is further achieved by means of a plug connector which has a housing, a holding frame arranged in the housing, and a plurality of contact inserts received in the holding frame, wherein the holding frame is designed and developed as described above.

Furthermore, the object according to the invention is achieved by means of an electronic device which has at least one above-described, designed and developed plug connector.

FIGS. 2 to 7 each show a schematic representation of a holding frame 100 which can be arranged in a housing of a plug connector.

The holding frame 100 has an integrally formed main frame 10. The main frame 10 has a first side wall 11, a second side wall 12 opposite the first side wall 11, a first end wall 13 and a second end wall 14 opposite the first end wall 13. The two side walls 11, 12 are arranged in parallel to one another. The two end walls 13, 14 are likewise arranged in parallel to one another. The end walls 13, 14 are arranged at a 90° angle to the side walls 11, 12. The two side walls 11, 12 and the two end walls 13, 14 enclose or delimit an interior 15 of the main frame 10. Contact inserts 200 can be inserted into this interior 15 in the insertion direction E and fastened as shown, for example, in FIG. 6.

Figure 1B:
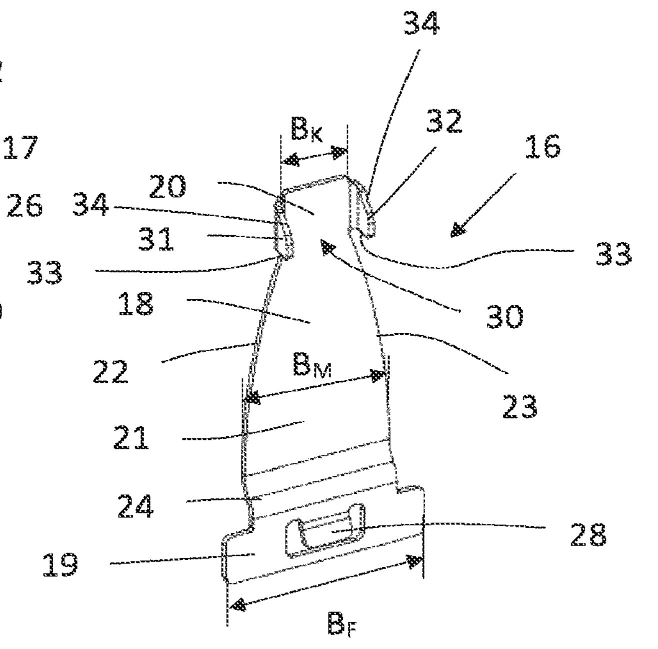
FIG. 1*b* is a further schematic representation of the wall segment shown in FIG. 1.

The contact inserts 200 are fastened via wall segments 16 arranged on the main frame 10, as are shown in particular in FIGS. 1*a* and 1*b*. The wall segments 16 arranged on a main frame 10 are in each case designed identically. In the main frame 10 shown here, four such wall segments 16 are arranged, wherein two wall segments 16 are arranged on the first side wall 11 and two wall segments 16 are arranged on the second side wall 12.

FIG. 1*a* shows a top view of an outer surface 17 of a wall segment 16, which, in the position mounted on the main frame 10, faces away from the interior 15 of the main frame 10.

FIG. 1*b* shows a top view of an inner surface 18 of the wall segment 16 which, in the position mounted on the main frame 10, faces in the direction of the interior 15 of the main frame 10.

The wall segments 16 are each designed to be resilient. The wall segments 16 can be formed from a spring plate.

The wall segments 16 each have a foot region 19, a head region 20 and a central section 21 arranged between the foot region 19 and the head region 20. Viewed along the length of the wall segment 16 from the foot region 19 toward the head region 20, the central section 21 has a substantially larger surface area than the head region 20 and the foot region 19. The foot region 19 is formed on a first end section of the wall segment 16 and the head region 20 is formed on a second end section of the wall segment 16 opposite the first end section.

The wall segment 16 has the greatest width $B_F$ at the foot region 19. The wall segment 16 has the smallest width $B_K$ at the head region 20. In the region of the central section 21, the wall segment 16 tapers in that the width $B_M$ of the central section 21 tapers starting from the foot region 19 toward the head region 20. Due to the tapering of the width $B_M$ of the central section 21 starting from the foot region 19 toward the head region 20, a uniform deformation of the wall segment 16 over the length of the wall segment 16 during insertion and removal of the contact inserts 200 can be achieved.

In the region of the central section 21, the outer edges 22, 23 of the wall segment 16 are not formed in a straight line, but they have a curved shape along the length of the central section 21 and thus starting from the foot region 19 up to the head region 20.

An offset is formed in the connection region 24 of the foot region 19 on the central section 21 in such a way that the foot region 19 extends in a first plane and the central section 21 extends in a second plane offset with respect to the first plane. The first plane and the second plane are oriented substantially in parallel to one another.

Figure 5:
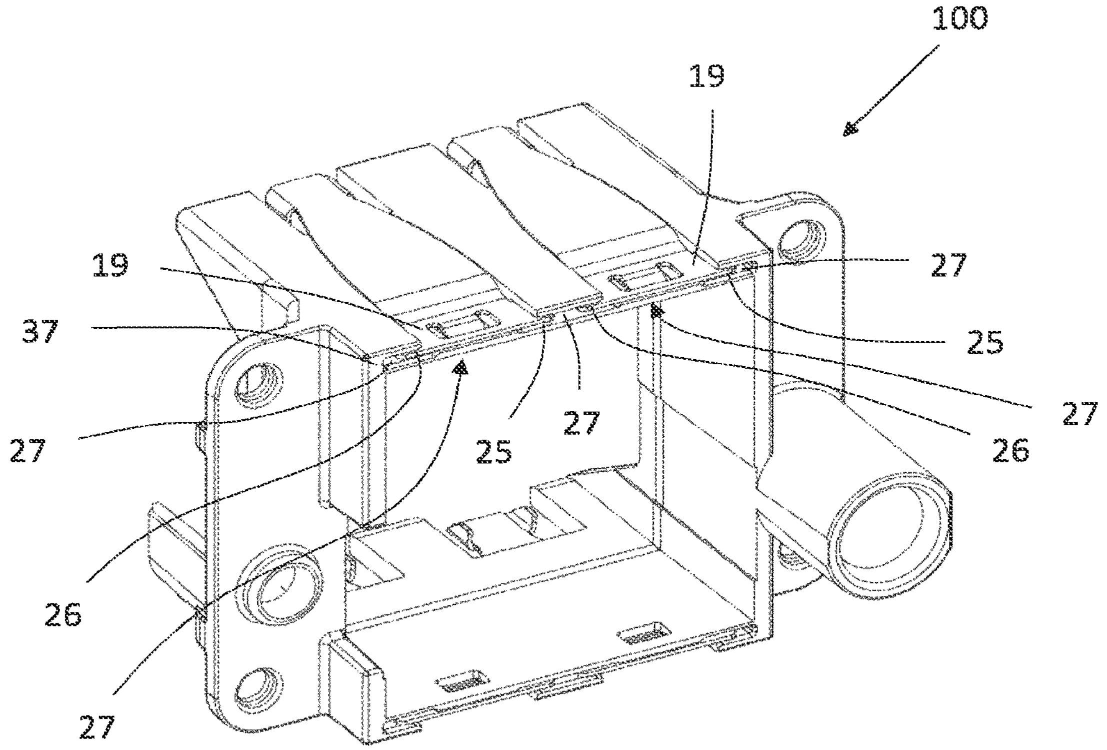
FIG. 5 is a schematic representation of the holding frame shown in FIG. 4 in a tilted view.

The foot region 19 has two laterally formed shoulder surfaces 25, 26 which, in the mounted position of the wall segment 16 on the main frame, can both engage in a slot-like cut-out 27, formed on the main frame 10, of a receiving section 35 as can be seen, for example, in FIG. 5. The two shoulder surfaces 25, 26 project laterally outward in such a way that they laterally overlap or project beyond the central section 21 and the head region 20.

The foot region 19 furthermore has a fastening element 28 which can engage in an opening 29 formed on the main frame 10. The fastening element 28 is designed here in the form of a tab which projects from the foot region 19 and which is bent in the direction of the main frame 10. The fastening element 28 in the form of the tab can hook into the opening 29. The fastening element 28 is formed in the center of the width $B_F$ of the foot region 19.

A fastening region 30, via which a contact insert 200 inserted into the interior 15 can be held in the interior 15, is formed at the head region 20. The fastening region 30 has two fastening tabs 31, 32. In the mounted position of the wall segment 16 on the main frame 10, the fastening tabs 31, 32 extend in the direction of the interior 15 of the main frame 10. The two fastening tabs 31, 32 are each integrally formed on one of the two outer edges 22, 23 of the wall segment 16. In the embodiments shown in FIGS. 1*a*, 1*b*, the fastening tabs 31, 32 are each bent at an angle α of about 90° to the outer edge 22, 23 of the wall segment 16. The fastening tabs 31, 32 are bent in the direction of the interior 15 of the main frame 10. The fastening tabs 31, 32 thus project from the main extension plane of the wall segments 16.

The lower edges 33 of the fastening tabs 31, 32, with which the fastening tabs 31, 32 rest on the projection elements 210 of the contact inserts 200 in order to be able to hold the contact inserts 200 in the interior 15 of the main frame 10, have a substantially straight design. The upper edges 34, opposite the lower edges 33, of the fastening tabs 31, 32 are, on the other hand, formed obliquely so that the upper edges 34 can form an insertion bevel in the direction of the insertion direction E of the contact inserts 200 into the interior 15 of the main frame 10. As a result of the insertion bevel, the contact inserts 200, in particular the projection elements 210 of the contact inserts 200, can slide during their insertion along the upper edge 34 of the two fastening tabs 31, 32 and thereby bend the wall segments 16 outward so that the wall segments 16 spring outward and release the interior 15 of the main frame 10 so that the contact inserts 200 can be inserted with their projection elements 210 into the interior 15 of the main frame 10. If the contact inserts 200 are inserted into the interior 15, the wall segments 16 can again spring back automatically until they rest with their lower edge 33 on the projection elements 210 in order to hold the contact inserts 200 in the interior 15 of the main frame 10.

Figure 2:
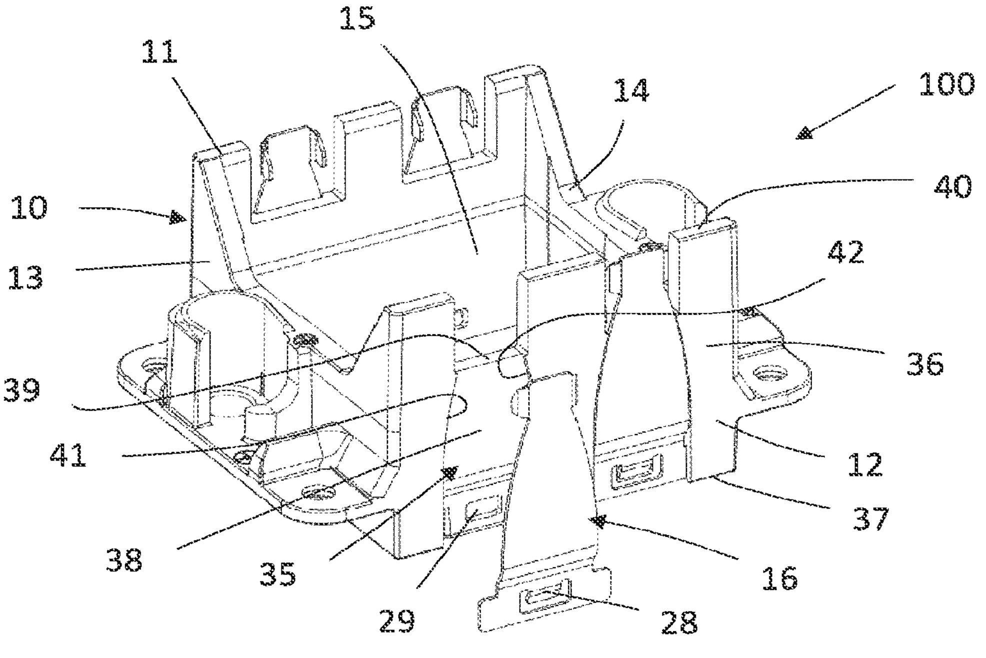
FIG. 2 is a schematic representation of a holding frame according to the invention during the mounting of a wall segment on a main frame.

As can be seen in FIG. 2, the main frame 10 has a receiving section 35 for each wall segment 16. The receiving sections 35 are formed on an outer side 36, facing away from the interior 15, of the main frame 10. The receiving sections 35 are formed on the two side walls 11 and 12 of the main frame 10. In the embodiment shown here, two receiving sections 35 are in each case formed both on the first side wall 11 and on the second side wall 12.

Each receiving section 35 has a slot-like cut-out 27 into which the foot region 19 of the respective wall segment 16 can be inserted with its two shoulder surfaces 25, 26. In the embodiment shown here, the slot-like cut-outs 27 of the receiving sections 35 of the first side wall 11 and the slot-like cut-outs 27 of the receiving section 35 of the second side wall 12 are in each case connected to one another, as can be seen in FIG. 5, so that the cut-outs 27 of the receiving sections 35 of a side wall 11, 12 together form one cut-out 27 per side wall 11, 12. The respective cut-out 27 extends over almost the entire length of the respective side wall 11, 12.

The cut-outs 27 of the receiving sections 35 are formed on a lower edge 37 of the main frame 10. The wall segments 16 can therefore be fastened to the main frame 10 from below along a mounting direction M. The wall segments 16 can thus be fastened on the main frame 10 counter to the insertion direction E of the contact inserts 200 into the interior 15 of the main frame 10.

The receiving sections 35 each have a bearing face 38 above their slot-like cut-out 27. The bearing faces 38 are each molded-in on the outer side 36 of the main frame 10 in that the bearing faces 38 each form a kind of cut-out on the outer side 36 of the main frame 10. In the mounted position, the central section 21 of the respective wall section 16 rests flat against the bearing face 38. The bearing faces 38 are each delimited by two opposite inner edges 41, 42, wherein, in the mounted position, the outer edges 22, 23 of the respective wall segment 16 rests against the inner edges 41, 42 in a positive-locking manner. The inner edges 41, 42 thus have a curved shape like the outer edges 22, 23. The inner edges 41, 42 are preferably designed to be high enough that, in the mounted state, the wall segments 16 terminate flush with the outer side 36 of the main frame 10. By means of the inner edges 41, 42, the bearing face 38 of the receiving sections 35 is in each case arranged at an offset to the outer side 36 of the main frame 10 in the direction of the interior 15 of the main frame 10.

Above the bearing face 38, the receiving sections 35 each have an opening 39 which, starting from an upper edge 40 of the main frame 10, extends into the respective side wall 11, 12 of the main frame 10. In the mounted position of the wall segments 16, the fastening region 30 or the head region 20 of the respective wall segment 16 overlap the opening 39 at least in some regions. The fastening tabs 31, 32 can project into the opening 39. In the region of the opening 39, the fastening tabs 31, 32 can retain the contact inserts 200 by the fastening tabs 31, 32 resting on the projection elements 210 of the contact inserts 200, which project into the opening 39, as can be seen in particular in FIG. 6.

Figure 7:
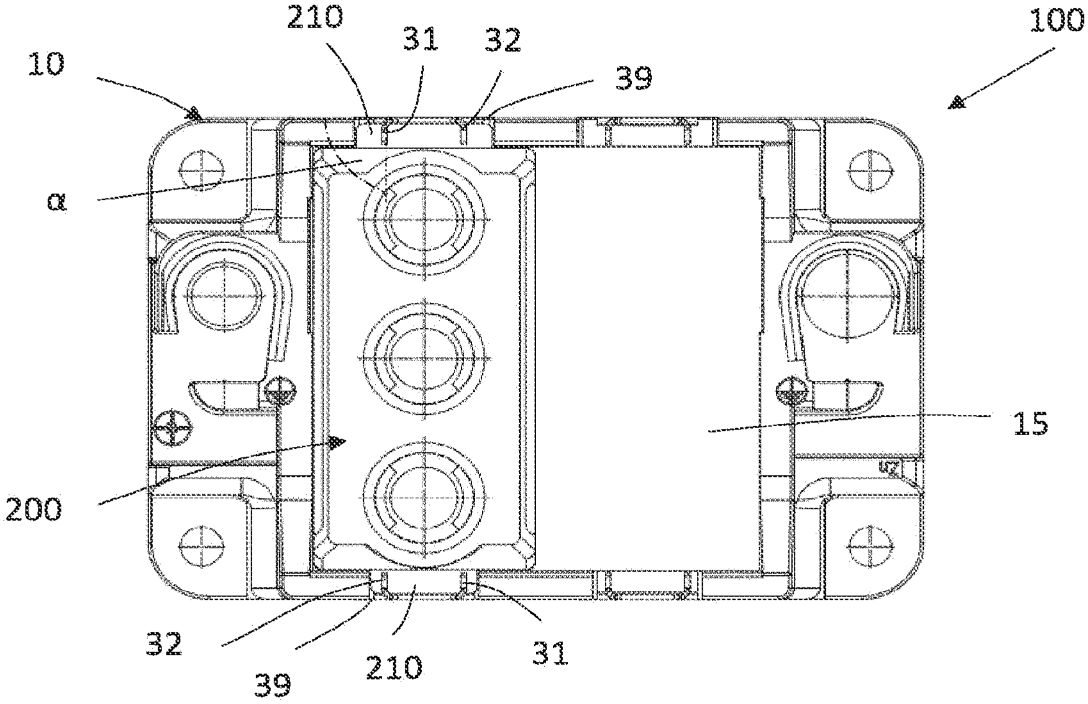
FIG. 7 is a schematic representation of the holding frame shown in FIG. 6 with the received contact insert as seen from above in a top view.

As can be seen in particular in FIG. 2 and FIG. 7, the openings 39 on the first side wall 11 have a greater width than the openings 39 on the second side wall 12.

Figure 3:
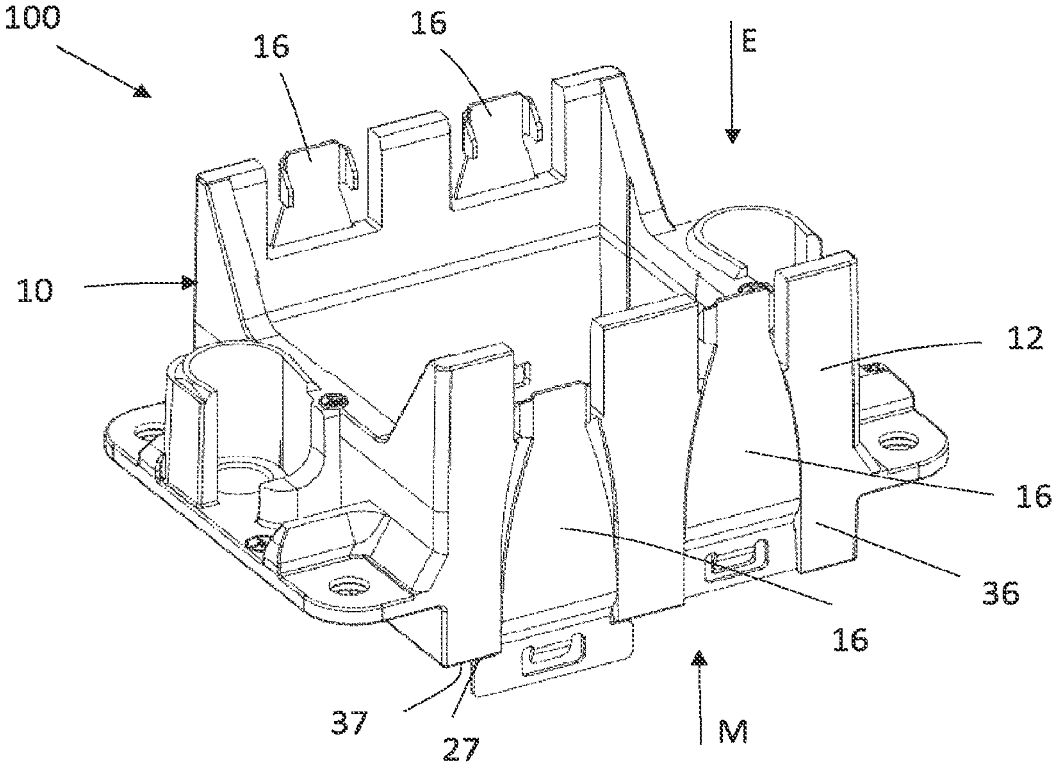
FIG. 3 is a further schematic representation of the holding frame shown in FIG. 2, during the mounting of a wall segment.
Figure 4:
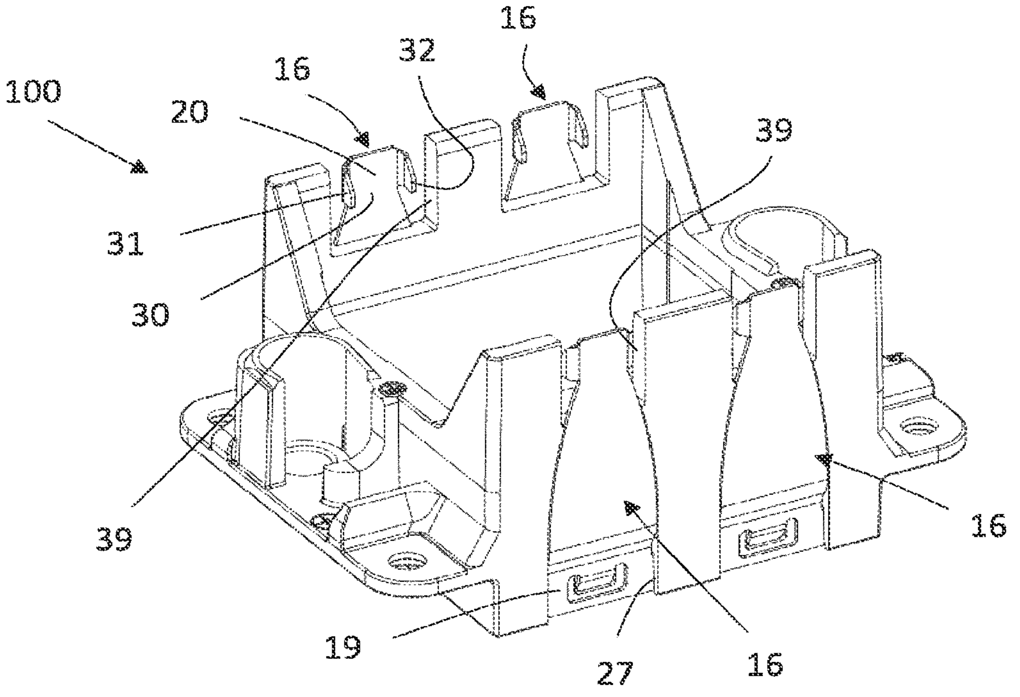
FIG. 4 is a schematic representation of the holding frame shown in FIGS. 2 and 3 with the wall segments in the mounted position.

FIG. 3 shows the mounting of one of the wall segments 16 on the main frame 10 by the wall segment 16 being inserted into the slot-like cut-out 27 in the mounting direction M, wherein in particular the two shoulder surfaces 25, 26 of the foot region 19 are inserted into the slot-like cut-out 27 and thus engage in the slot-like cut-out 27. With its central section 21, the wall segment 16 slides along the bearing face 38. The wall segments 16 are inserted such far that the fastening element 28 of the foot region 19 is hooked into the opening 29 on the main frame 10, as can be seen in FIG. 4. In this mounted position, the head region 20 or the fastening region 30 of the wall segment 16 is located in the region of the opening 39 in order to overlap it at least in some regions.

Figure 6:
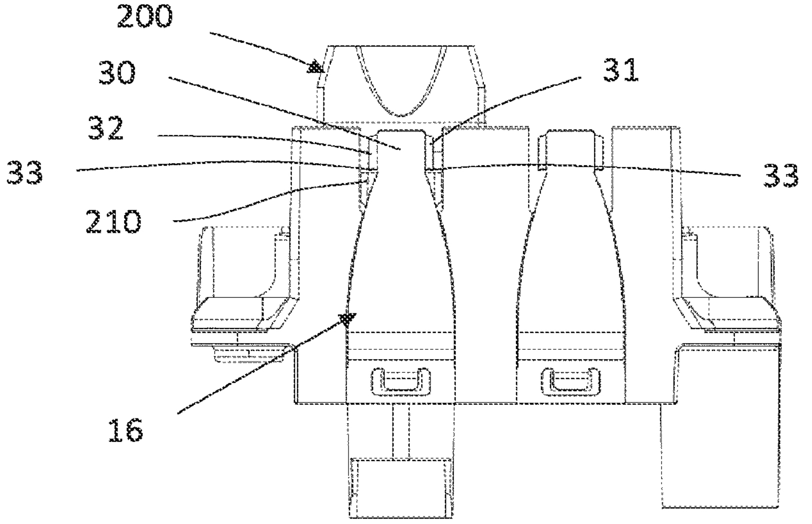
FIG. 6 is a schematic representation of the holding frame shown in FIG. 4 with a received contact insert.

If the wall segments 16 are mounted on the main frame 10, the contact inserts can be inserted into the interior 15 of the main frame 10 in the insertion direction E. In this case, the contact inserts 200 slide with their projection elements 210 along the upper edges 34 of the fastening tabs 31, 32, as a result of which said fastening tabs, and thus the fastening region 30, spring outward in order to allow the projection elements 210 to pass at the fastening tabs 31, 32. If the contact inserts 200 are guided past the fastening tabs 31, 32, they can spring back again in the direction of the interior 15 until they rest on the projection element 210 at the top, as can be seen in FIGS. 6 and 7. In this position, the projection elements 210 are each covered at the end face by the wall segment 16 assigned to them, in particular by the central section 21 of the wall segment 16, as can be seen, for example, in FIGS. 6 and 7.

Figure 8:
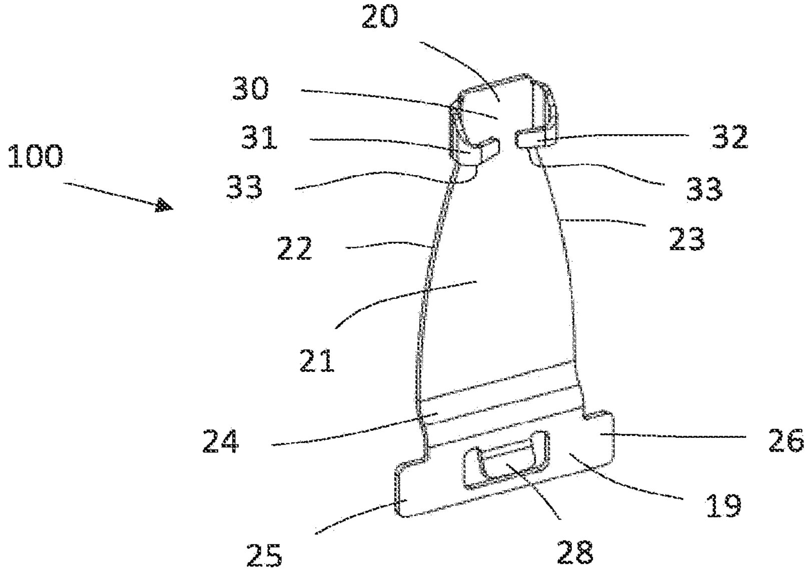
FIG. 8 is a schematic representation of a further wall segment according to the invention.
Figure 9:
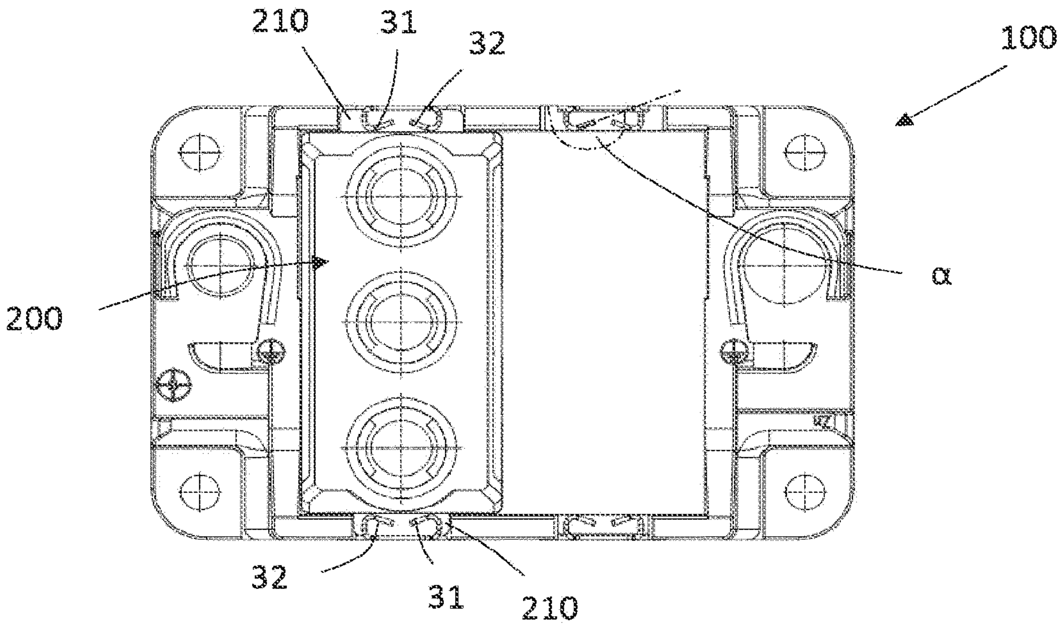
FIG. 9 is a schematic representation of a holding frame with wall segments as shown in FIG. 8, and a received contact insert.

FIGS. 8 and 9 show a similar embodiment to the embodiment shown in FIGS. 1*a*, 1*b* and 2 to 7, wherein here only the shape of the fastening tabs 31, 32 is designed differently because here the fastening tabs 31, 32 are bent at an angle α≥180° to the outer edges 22, 23 of the wall segment 16. In the embodiment shown in FIGS. 8 and 9, the fastening tabs 31, 32 of a wall segment 16 are bent toward one another. The fastening tabs 31, 32 are designed to be substantially U-shaped here.

Figure 10:
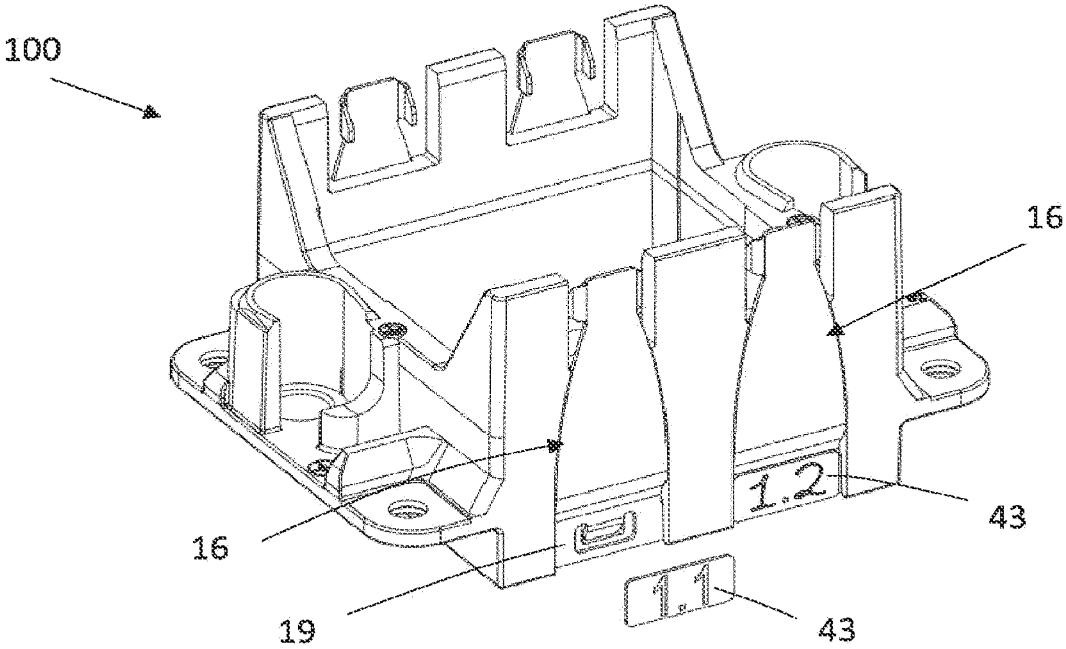
FIG. 10 is a schematic representation of a holding frame as shown in FIG. 4, with identification elements.

FIG. 10 further shows the arrangement of an identification element 43 in the region of the wall segment 16. The identification element 43 is arranged at the foot region 19 on the wall segment 16. Here, the identification element 43 is fastened to the foot region 19 of the wall segment 16 by an adhesive connection.

Figure 11:
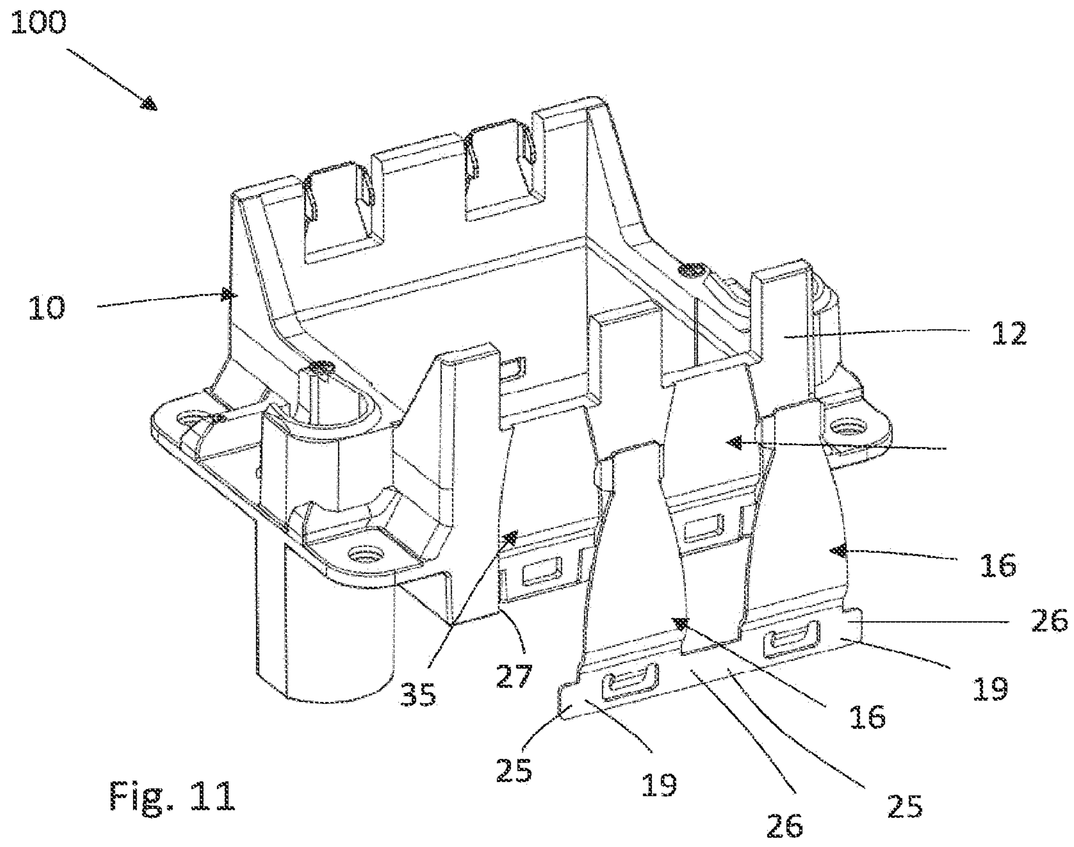
FIG. 11 is a schematic representation of a holding frame according to the invention during the mounting of two wall segments integrally connected to one another on a main frame.
Figure 12:
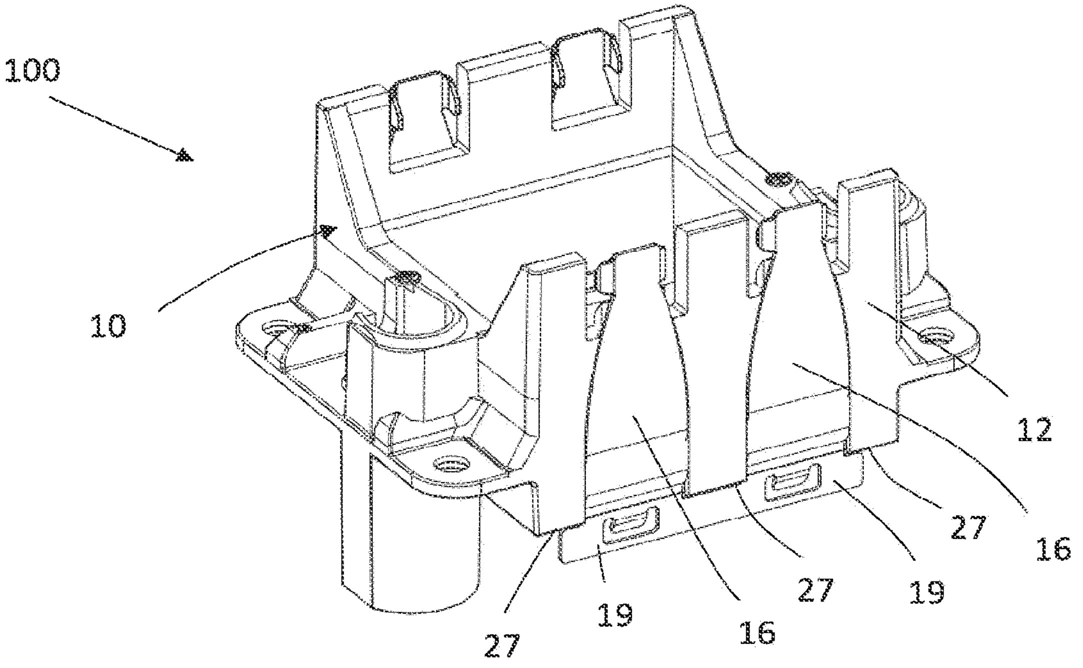
FIG. 12 is a further schematic representation of the two wall segments integrally connected to one another and shown in FIG. 11, during the mounting on the main frame.

FIGS. 11 and 12 show an embodiment in which the two wall segments 16 arranged on a side wall 12 are integrally connected to one another. The two wall segments 16 are formed integrally with one another at their foot region 19. The wall sections 16 are integrally connected to one another via the shoulder surfaces 25, 26 of the foot regions 19.

The cut-out 26 extends here over the two receiving sections 35 of the side wall 12 and thus over almost the entire length of the side wall 12. The integrally formed wall segments 16 can thus be inserted simultaneously into the cut-out 26 via their integrally formed foot regions 19 and thus be mounted on the main frame 10 or on the side wall 12 of the main frame 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Holding frame
10 Main frame
11 First side wall
12 Second side wall
13 First end wall
14 Second end wall
15 Interior
16 Wall segment
17 Outer surface
18 Inner surface
19 Foot region
20 Head region
21 Central section
22 Outer edge
23 Outer edge
24 Connection region
25 Shoulder surface
26 Shoulder surface
27 Cut-out
28 Fastening element
29 Opening
30 Fastening region
31 Fastening tab
32 Fastening tab
33 Lower edge
34 Upper edge
35 Receiving section
36 Outer side
37 Lower edge
38 Bearing face
39 Opening
40 Upper edge
41 Inner edge
42 Inner edge
43 Identification element
200 Contact insert
210 Projection element
E Insertion direction
M Mounting direction
$B_F$ Foot region width
$B_M$ Central section width
$B_K$ Head region width

The invention claimed is:

1. A holding frame for a plug connector, for receiving contact inserts, comprising:

a main frame, which has a first side wall, a second side wall opposite the first side wall, a first end wall, and a second end wall opposite the first end wall, the first side wall, the second side wall, the first end wall, and the second end wall enclosing an interior of the main frame into which the contact inserts are insertable in an insertion direction; and a plurality of wall segments, each of which has a fastening region via which the contact inserts which are inserted into the interior of the main frame are holdable on the main frame, wherein, in a mounted position, each wall segment of the plurality of wall segments is arranged on a receiving section formed on the first side wall or on the second side wall, wherein the respective receiving sections each have an opening configured to receive a projection element of a contact insert inserted into the interior, wherein the openings in the mounted position are each overlapped at least in some regions by the fastening region of a respective wall segment assigned to the receiving section, wherein the fastening region of each of the plurality of wall segments has at least one fastening tab which, in the mounted position, projects through the opening of a receiving section, wherein the fastening region of the wall segments has two fastening tabs which, in the mounted position, project through the opening of a receiving section, and wherein the two fastening tabs of a fastening region of a wall segment are arranged on opposite outer edges of the wall segment.

2. The holding frame of claim 1, wherein the openings, formed on the first side wall, of the receiving sections have a greater width than the openings, formed on the second side wall, of the receiving sections.

3. The holding frame of claim 1, wherein the fastening tabs are each bent at an angle $\alpha \geq 90°$ to the outer edge of the wall segment.

4. The holding frame of claim 1, wherein the receiving sections are each formed on an outer side, facing away from the interior, of the main frame.

5. The holding frame of claim 1, wherein the fastening region of the wall segments is in each case formed on a head region of the wall segments, which head region is positioned on an end section, opposite a foot region, of the wall segment.

6. The holding frame of claim 5, wherein the wall segments are each fastened via their foot region to the receiving section assigned to them.

7. The holding frame of claim 6, wherein each receiving section has a slot-like cut-out into which the foot region of the wall segment assigned to the receiving section is inserted in a mounted position.

8. The holding frame of claim 7, wherein the slot-like cut-out of the receiving sections is in each case formed at a lower edge of the main frame.

9. The holding frame of claim 7, wherein the slot-like cut-outs, formed on the first side wall, of the receiving sections are connected to one another, and/or wherein the slot-like cut-outs, formed on the second side wall, of the receiving sections are connected to one another.

10. The holding frame of claim 5, wherein each wall segment has a central section between the foot region and the head region, and wherein a width of the central section tapers starting from the foot region toward the head region.

11. The holding frame of claim 10, wherein outer edges, extending along the central section, of the wall segment have a curved shape.

12. The holding frame of claim 10, wherein, in a connection region of the foot region, an offset is formed on the central section such that the foot region extends in a first plane and the central section extends in a second plane arranged at an offset to the first plane.

13. The holding frame of claim 10, wherein the receiving sections each have a bearing face against which an inner surface, facing in a direction of the interior of the main frame, of the wall segments in the mounted position rests flat in a region of the central section of the wall segments.

14. The holding frame of claim 13, wherein the bearing face of a receiving section is delimited by two opposing inner edges, and wherein, in the mounted position, outer edges of the wall segments in a region of the central section of the wall segments rest in a positive-locking manner against the inner edges of the receiving section assigned thereto.

15. The holding frame of claim 5, wherein at the foot region, each wall segment of the plurality of wall segments has a fastening element which, in the mounted position, is engaged with an opening formed on the main frame.

16. The holding frame of claim 1, wherein an identification element is attachable to each wall segment of the plurality of wall segments.

17. The holding frame of claim 1, wherein at least two wall segments of the plurality of wall segments arranged on one side wall are connected to one another.

18. The holding frame of claim 17, wherein the at least two wall segments are integrally formed with one another at foot regions thereof.

19. A plug connector, comprising:

a housing;

the holding frame of claim 1 arranged in the housing; and a plurality of contact inserts received in the holding frame.

20. An electronic device, comprising:

at least one plug connector of claim 19.

21. A holding frame for a plug connector, for receiving contact inserts, comprising:

a main frame, which has a first side wall, a second side wall opposite the first side wall, a first end wall, and a second end wall opposite the first end wall, the first side wall, the second side wall, the first end wall, and the second end wall enclosing an interior of the main frame into which the contact inserts are insertable in an insertion direction; and a plurality of wall segments, each of which has a fastening region via which the contact inserts which are inserted into the interior of the main frame are holdable on the main frame, wherein, in a mounted position, each wall segment of the plurality of wall segments is arranged on a receiving section formed on the first side wall or on the second side wall, wherein the respective receiving sections each have an opening configured to receive a projection element of a contact insert inserted into the interior, wherein the openings in the mounted position are each overlapped at least in some regions by the fastening region of a respective wall segment assigned to the receiving section, wherein the fastening region of the wall segments is in each case formed on a head region of the wall segments, which head region is positioned on an end section, opposite a foot region, of the wall segment, wherein each wall segment has a central section between the foot region and the head region, and wherein a width of the central section tapers starting from the foot region toward the head region.

22. The holding frame of claim 21, wherein outer edges, extending along the central section, of the wall segment have a curved shape.

23. A holding frame for a plug connector, for receiving contact inserts, comprising:

a main frame, which has a first side wall, a second side wall opposite the first side wall, a first end wall, and a second end wall opposite the first end wall, the first side wall, the second side wall, the first end wall, and the second end wall enclosing an interior of the main frame into which the contact inserts are insertable in an insertion direction; and a plurality of wall segments, each of which has a fastening region via which the contact inserts which are inserted into the interior of the main frame are holdable on the main frame, wherein, in a mounted position, each wall segment of the plurality of wall segments is arranged on a receiving section formed on the first side wall or on the second side wall, wherein the respective receiving sections each have an opening configured to receive a projection element of a contact insert inserted into the interior, wherein the openings in the mounted position are each overlapped at least in some regions by the fastening region of a respective wall segment assigned to the receiving section, and wherein at least two wall segments of the plurality of wall segments arranged on one side wall are connected to one another.

* * * * *